(12) United States Patent
Wang

(10) Patent No.: US 8,257,854 B2
(45) Date of Patent: Sep. 4, 2012

(54) ELECTRONIC DEVICE

(75) Inventor: Hua-Qi Wang, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 239 days.

(21) Appl. No.: 12/844,831

(22) Filed: Jul. 28, 2010

(65) Prior Publication Data

US 2011/0189537 A1    Aug. 4, 2011

(30) Foreign Application Priority Data

Feb. 2, 2010   (CN) .................. 2010 2 0302157 U

(51) Int. Cl.
 *H01M 2/10*   (2006.01)
(52) U.S. Cl. .............................. 429/99; 429/97; 429/100
(58) Field of Classification Search .................. None
 See application file for complete search history.

(56) References Cited

U.S. PATENT DOCUMENTS 5,039,580 A * 8/1991 Mori et al. ................ 429/97
6,306,538 B1 * 10/2001 Saitoh et al. .............. 429/96

* cited by examiner

*Primary Examiner* — Jonathan Crepeau
(74) *Attorney, Agent, or Firm* — Altis Law Group, Inc.

(57) ABSTRACT

An electronic device includes a battery box receiving two batteries for providing power. The battery box includes a holding base defining two neighboring receiving rooms and a sliding groove and a slidable block slidably installed in the sliding groove to position the batteries in the receiving rooms. The batteries are received in the receiving rooms via passing over the sliding groove. The slidable block includes a retaining shoulder, a positioning portion protruding from one side of the retaining shoulder and used to match with the sliding groove, a stopper plate and a tab connected between the stopper plate and the retaining shoulder. The stopper plate and the tab are protruding from the other side of the retaining shoulder.

9 Claims, 6 Drawing Sheets

ELECTRONIC DEVICE

BACKGROUND

1. Technical Field

The present disclosure generally relates to electronic devices, and more particularly to an electronic device having a battery box positioning two batteries simultaneously.

2. Description of Related Art

Electronic devices can include one or more batteries for providing power. Generally, the batteries are positioned in a battery box of the electronic device via springs urged between the battery box and electrodes of the batteries, so as to provide an electronic connection between the batteries and the electronic device. Each battery is positioned in the battery box by one group of springs. Therefore, if an electronic device includes a plurality of batteries, a plurality groups of springs are required to position the plurality of batteries, leading to a complicated structure of the battery box and a high cost of the electronic device.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
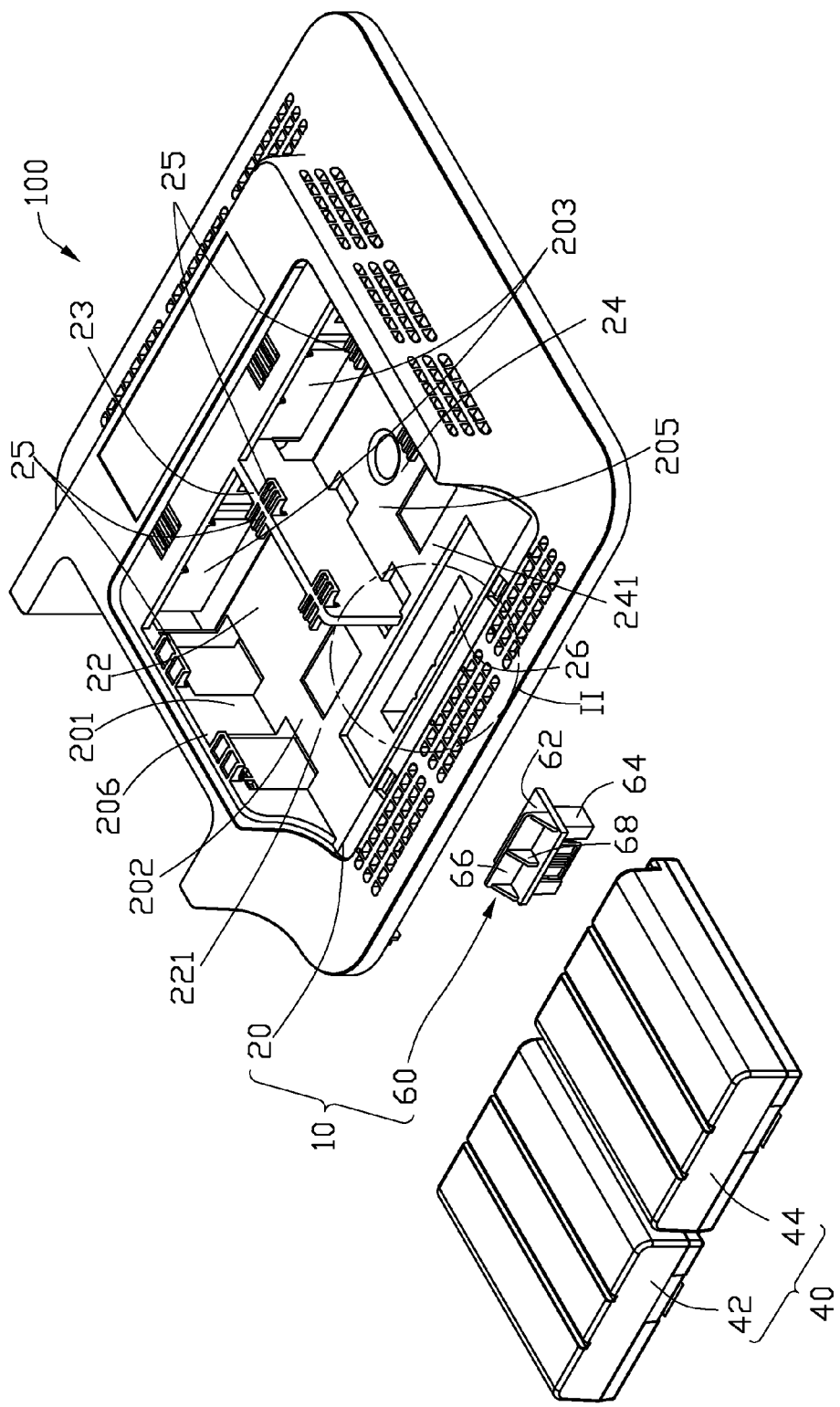
FIG. 1 is an exploded view of an electronic device of an exemplary embodiment of the disclosure.

Referring to FIG. 1, an electronic device 100 comprises a battery box 10 used to contain two batteries 42, 44 therein simultaneously. The battery box 10 comprises a holding base 20 and a slidable block 60. The holding base 20 comprises two opposite side walls 201, a ground 202 and a bottom wall 203 which collectively define a cavity 205. A spacer 23 is disposed in the middle of the cavity 205 to separate the cavity 205 into two neighboring receiving rooms 22, 24 to receive the two batteries 42, 44 respectively. A sliding groove 26 is defined beside the spacer 23 to receive the slidable block 60.

In the embodiment, the sliding groove 26 is substantially perpendicular to the spacer 23. At a top portion 206 opposite to the ground 202 of the holding base 20, a plurality of positioning blocks 25 extend from the two opposite side walls 201 and the spacer 23 toward the receiving rooms 22, 24 to position the batteries 42, 44 in the receiving rooms 22, 24. In this way, the receiving room 22 and the receiving room 24 respectively define an entrance 221 and an entrance 241. The batteries 42, 44 pass through the two entrances 221, 241 to the receiving rooms 22, 24. That is, the batteries 42, 44 are received in the receiving rooms 221, 241 via passing over the sliding groove 26.

The sliding groove 26 is defined in front of the two entrances 221, 241. The slidable block 60 is slidably installed in the sliding groove 26 to prevent the batteries 42, 44 from being dislocated in the receiving rooms 22, 24.

Figure 2:
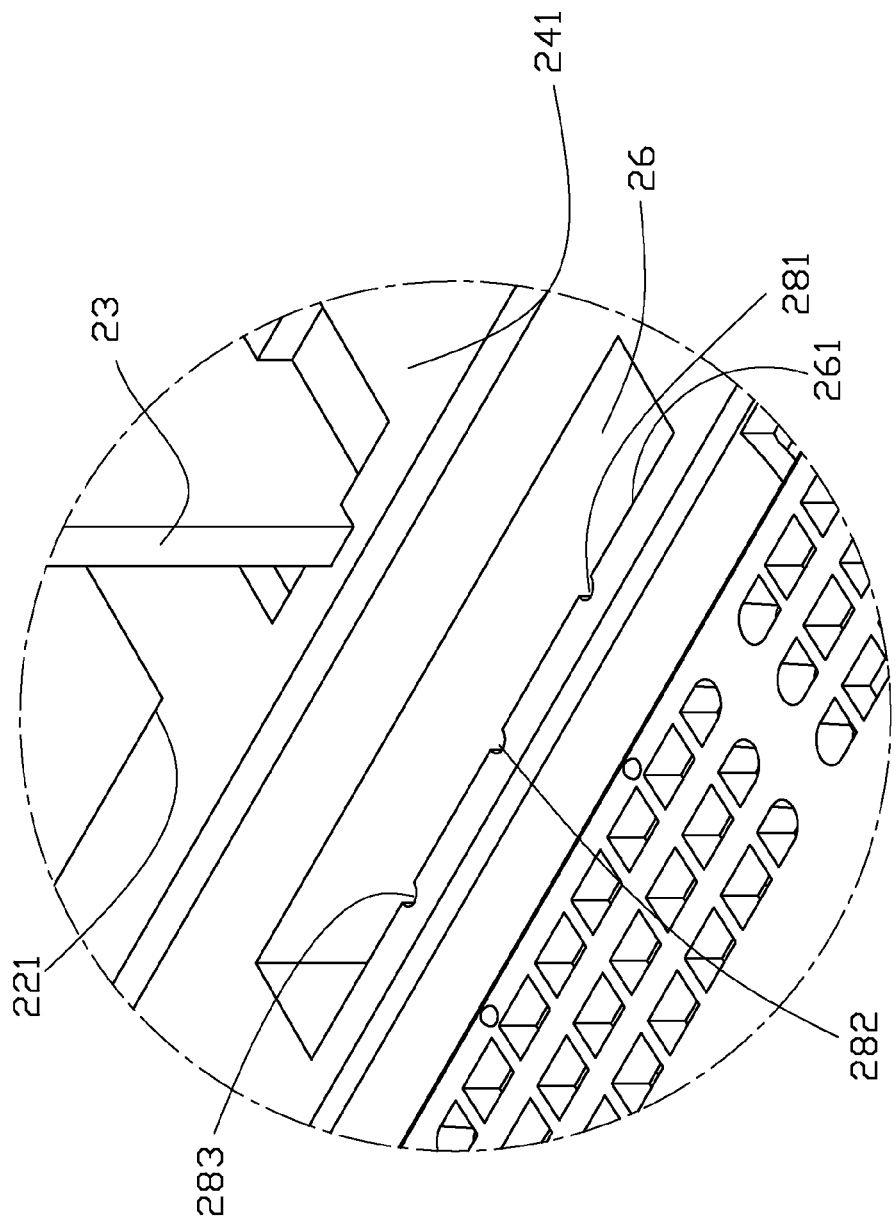
FIG. 2 is an enlarged, perspective view of "II" area shown in FIG. 1.
Figure 3:
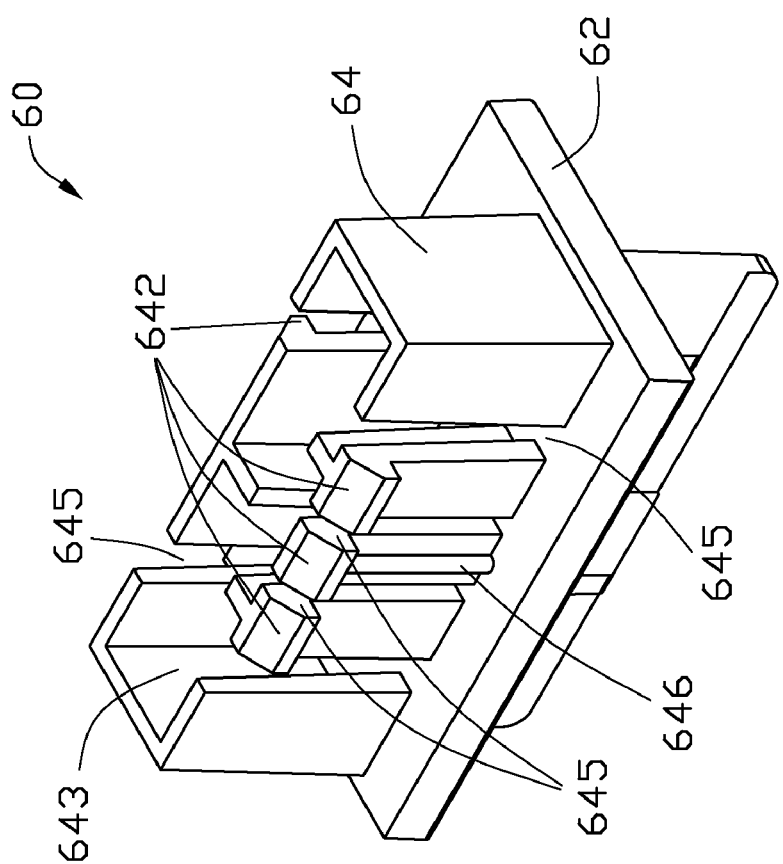
FIG. 3 is an enlarged, perspective view of a slidable block of FIG. 1.
Figure 4:
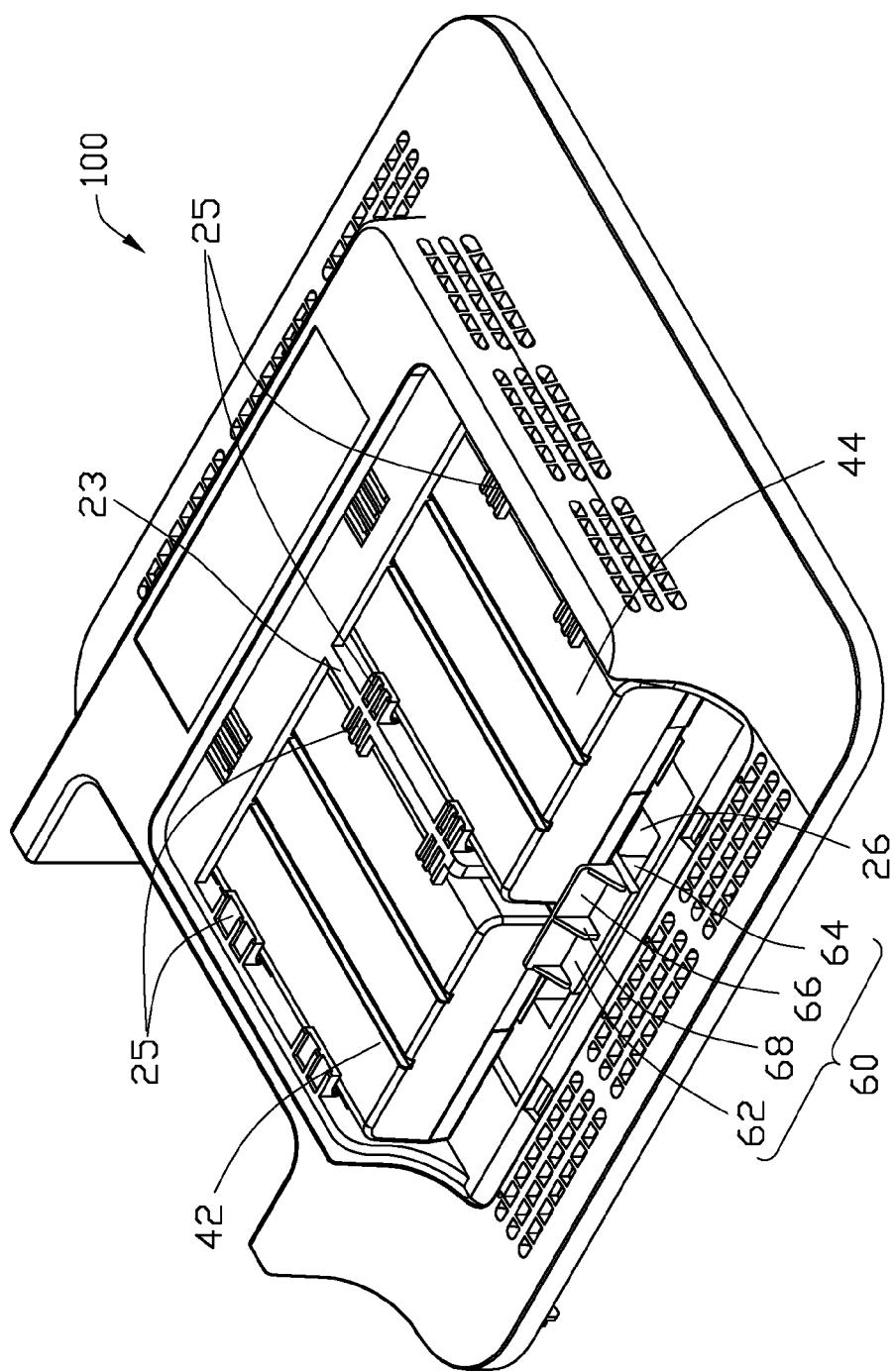
FIG. 4 is an assembled perspective view of FIG. 1.
Figure 5:
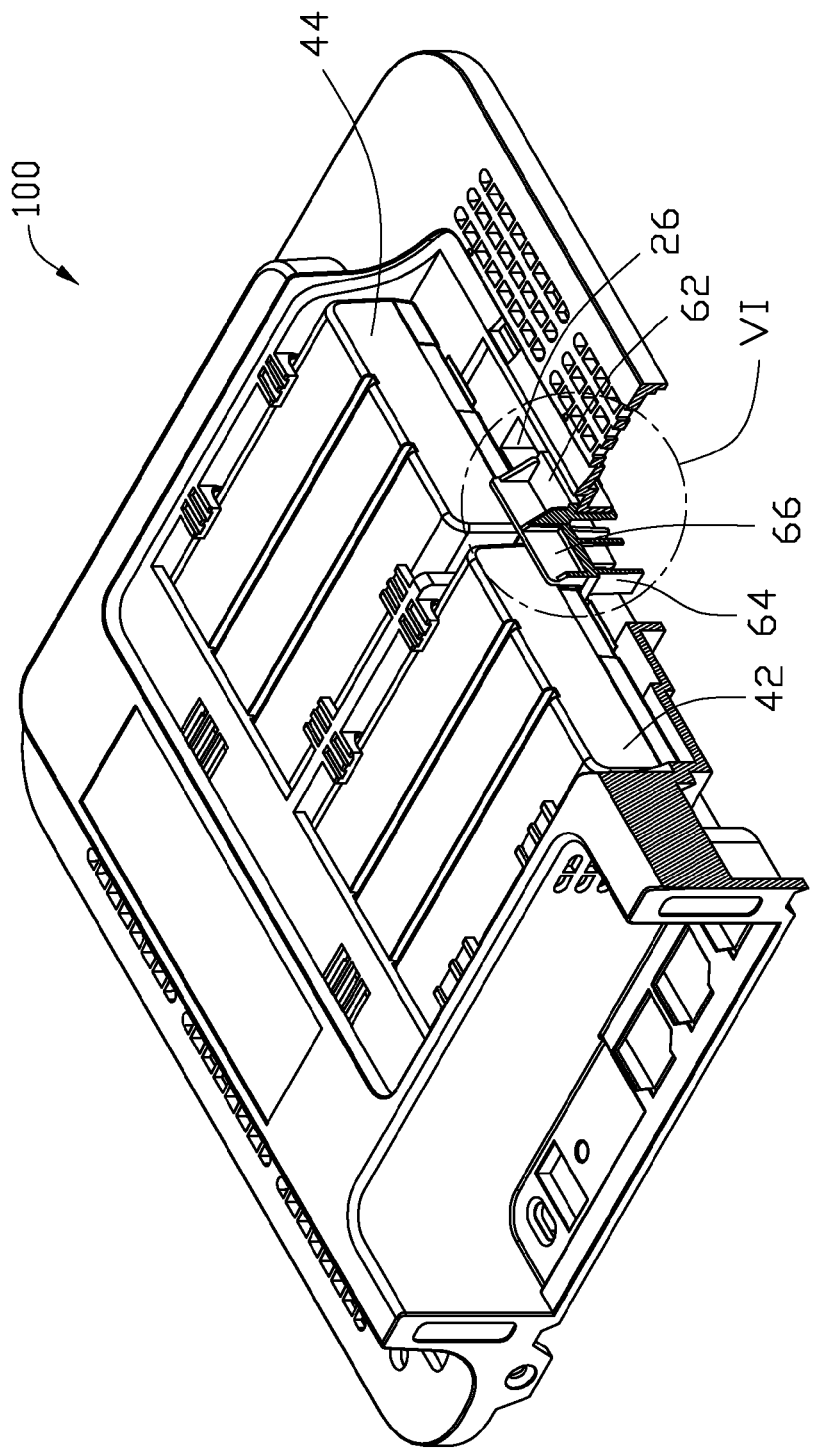
FIG. 5 is a partially cut-away view of FIG. 4.
Figure 6:
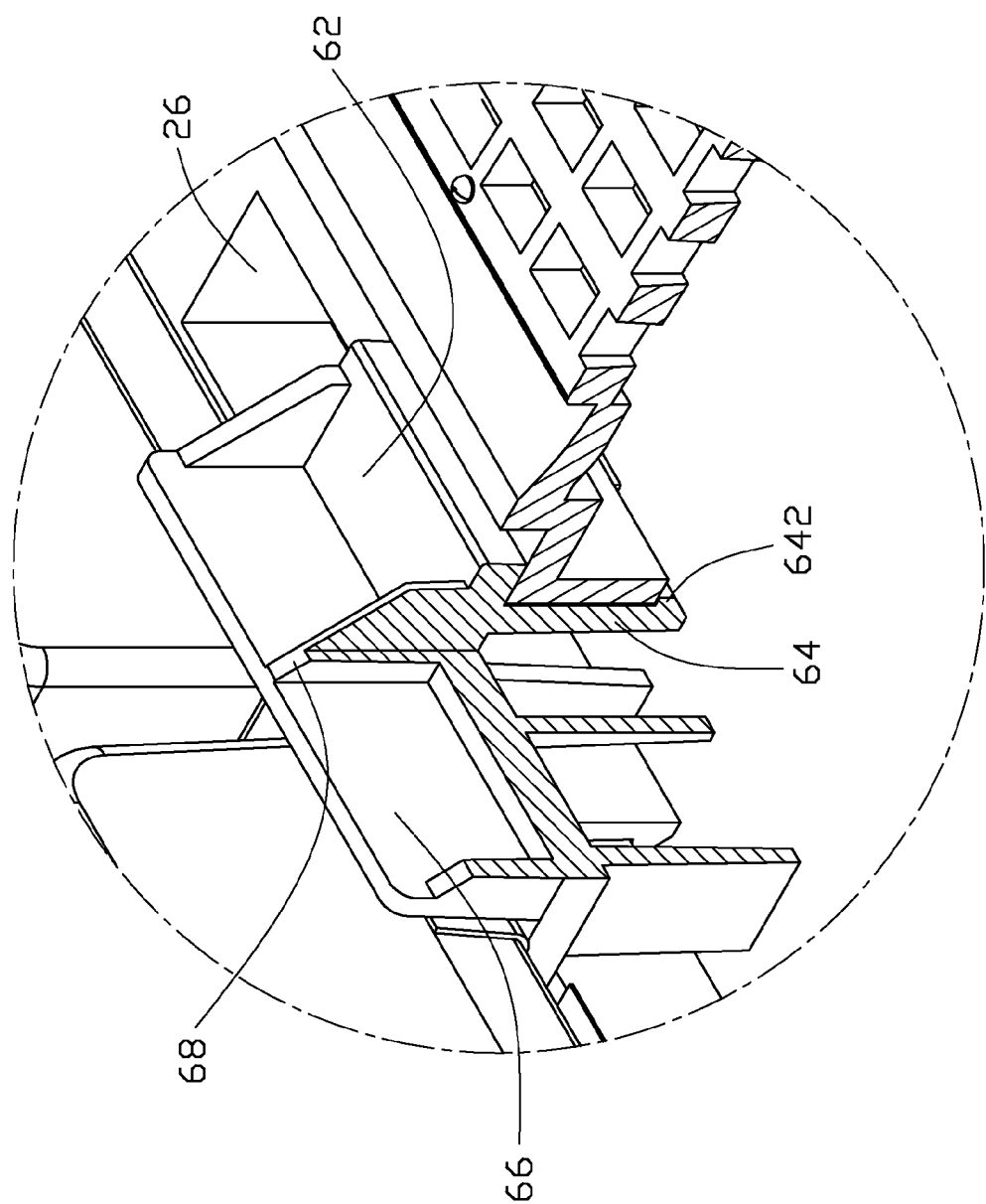
FIG. 6 is an enlarged, perspective view of "VI" area shown in FIG. 5.

Referring to FIG. 2, three recesses 281, 282, 283 are defined in an inner wall 261 of the sliding groove 26. The recess 282 is located in the middle of the inner wall 261 and right opposite to the spacer 23. The other two recesses 281, 283 are symmetrically located at two sides of the recess 282.

Referring to FIGS. 3-6, the slidable block 60 comprises a retaining shoulder 62, a positioning portion 64, a stopper plate 66 and a tab 68. The positioning portion 64 protrudes from one side of the retaining shoulder 62 toward the sliding groove 26. The stopper plate 66 and the tab 68 protrude from the retaining shoulder 62 and extend away from the positioning portion 64 for limiting the batteries 42, 44 to move out from the receiving rooms 22, 24. In assembly, the positioning portion 64 is received in and match with the sliding groove 26, and the retaining shoulder 62 is positioned at one edge of the sliding groove 26.

The positioning portion 64 comprises a plurality of hooks 642 and at least one latching strip 646. In this embodiment, the positioning portion 64 comprises one latching strip 646. The hooks 642 are configured on a free end of the positioning portion 64 to hook the other edge of the sliding groove 26. That is, the retaining shoulder 62 and the hooks 642 are respectively located two opposite edges of the sliding groove 26. The latching strip 646 is configured on the middle of the positioning portion 64 and perpendicular to the retaining shoulder 62. The latching strip 646 engages with the recesses 281, 282, 283 to latch the slidable block 60 in different stations of the sliding groove 26.

In this embodiment, the positioning portion 64 defines a hollow cavity 643 and a plurality of gaps 645 configured between the hooks 642 to improve elasticity of the hooks 642. The gaps 645 are parallel with the latching strip 646.

The stopper plate 66 is perpendicular to the retaining shoulder 62 and used to stop the batteries 42, 44 from moving out from the receiving rooms 22, 24. The tab 68 is perpendicularly connected between the stopper plate 66 and the retaining shoulder 62 to improve strength of the stopper plate 66 and convenient for a user to handle the movement of the slidable block 60 in the sliding groove 26. That is, the tab 68 makes the stopper plate 66 attach to the retaining shoulder 62 more securely, and the user can operate the tab 68 to move the slidable block 60 in the sliding groove 26.

When the user moves the slidable block 60 to make the latching strip 646 move into and engage with the recess 282, the slidable block 60 can position the batteries 42, 44 in the receiving rooms 22, 24 simultaneously. When the user moves the slidable block 60 to make the latching strip 646 engage with the recess 281, the slidable block 60 stops the battery 44 in the receiving room 24, and the user can move the battery 42 into or out from the receiving room 22. When the user moves the slidable block 60 to make the latching strip 646 engage with the recess 283, the slidable block 60 stops the battery 42 in the receiving room 22, and the user can move the battery 44 into or out from the receiving room 24.

The batteries 40 are positioned in the battery box 10 and electronically connected to the electronic device 100 simultaneously via position of the slidable block 60. Therefore, the battery box 10 of this disclosure has a simple structure and a low cost.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An electronic device, comprising a battery box receiving two batteries for providing power, the battery box comprising:
    a holding base, defining two neighboring receiving rooms and a sliding groove, the batteries received in the receiving rooms via passing over the sliding groove; and
    a slidable block, slidably installed in the sliding groove to prevent the batteries from being dislocated in the receiving rooms, the slidable block comprising a retaining shoulder, a positioning portion, a stopper plate and a tab, the positioning portion protruding from the retaining shoulder toward the sliding groove, the stopper plate and the tab protruding from the retaining shoulder and extending away from the positioning portion, the positioning portion received in and matching with the sliding groove, the retaining shoulder positioned on one edge of the sliding groove, the stopper plate perpendicular to the retaining shoulder and used to stop the batteries from moving from the receiving rooms, the tab connected between the stopper plate and the retaining shoulder to improve strength of the stopper plate;
    wherein the positioning portion comprises a plurality of hooks configured on a free end of the positioning portion to hook the other edge of the sliding groove.

2. The electronic device as claimed in claim 1, wherein the positioning portion defines a hollow cavity and a plurality of gaps configured between the hooks to improve elasticity of the hooks.

3. The electronic device as claimed in claim 2, wherein an inner wall of the sliding groove defines three recesses, the positioning portion of the slidable block comprises a latching strip used to engage with the recesses to latch the slidable block in different stations of the sliding groove.

4. The electronic device as claimed in claim 3, wherein the holding base comprises a spacer used to space the two receiving rooms from each other and opposite to the middle part of the sliding groove.

5. The electronic device as claimed in claim 4, wherein the latching strip is configured on the middle of the positioning portion, one of the recesses is located in the middle of the inner wall of the sliding groove and right opposite to the spacer, and the other two recesses are symmetrically located at two sides of the spacer.

6. The electronic device as claimed in claim 5, wherein the plurality of gaps are parallel with the latching strip.

7. The electronic device as claimed in claim 6, wherein the latching strip is perpendicular to the retaining shoulder.

8. The electronic device as claimed in claim 7, wherein the holding base comprises two opposite side walls, a ground and a bottom wall which collectively define a cavity, the spacer is disposed in the middle of the cavity to separate the cavity into the two receiving rooms.

9. The electronic device as claimed in claim 8, wherein at a top portion of the holding base, a plurality of positioning blocks extend from the two opposite side walls and the spacer toward the receiving rooms to position the batteries in the receiving rooms.

* * * * *